United States Patent
Glatz et al.

(10) Patent No.: US 8,163,435 B2
(45) Date of Patent: Apr. 24, 2012

(54) POROUS BODY AND PRODUCTION METHOD

(75) Inventors: Wolfgang Glatz, Reutte (AT); Georg Kunschert, Weissenbach (AT); Gebhard Zobl, Schattwald (AT); Reinhold Zach, Reutte (AT)

(73) Assignee: Plansee SE, Reutte (AT)

( * ) Notice: Subject to any disclaimer, the term of this patent is extended or adjusted under 35 U.S.C. 154(b) by 321 days.

(21) Appl. No.: 12/199,397

(22) Filed: Aug. 27, 2008

(65) Prior Publication Data

US 2009/0042080 A1 Feb. 12, 2009

Related U.S. Application Data

(63) Continuation of application No. PCT/AT2007/000092, filed on Feb. 23, 2007.

(30) Foreign Application Priority Data

Feb. 27, 2006 (AT) ................... GM143/2006

(51) Int. Cl.
*H01M 8/10* (2006.01)
*B32B 5/18* (2006.01)
(52) U.S. Cl. .......................... 429/469; 419/2
(58) Field of Classification Search .............. 429/12–46, 429/469, 479; 419/2; 428/315.7, 317.9
See application file for complete search history.

(56) References Cited

U.S. PATENT DOCUMENTS

| 5,169,461 | A | 12/1992 | Watwe et al. |
| 6,410,160 | B1 | 6/2002 | Landin et al. |
| 6,737,186 | B2 | 5/2004 | Janousek et al. |
| 7,037,464 | B2 | 5/2006 | Ohtsuka et al. |
| 2002/0195188 | A1 | 12/2002 | Kuhstoss et al. |

FOREIGN PATENT DOCUMENTS

| DE | 196 43 156 C1 | 2/1998 |
| EP | 0 487 276 A1 | 5/1992 |
| EP | 0 488 716 A1 | 6/1992 |
| EP | 1 065 020 A1 | 1/2001 |
| EP | 1 263 067 A2 | 12/2002 |
| EP | 1 318 560 A2 | 6/2003 |
| EP | 1 528 112 A1 | 5/2005 |
| WO | 01/49440 A1 | 7/2001 |

OTHER PUBLICATIONS

A.B. Al'tman et al. "Relationship Between the Total and Open Porosity of Sintered Cu-Sn-C Materials," Powder Metallurgy and Metal Ceramics, 1966, vol. 5, pp. 33-36.*
International Search Report, dated Oct. 1, 2007.

* cited by examiner

*Primary Examiner* — Cynthai H. Kelly
*Assistant Examiner* — Monique Wills
(74) *Attorney, Agent, or Firm* — Laurence A. Greenberg; Werner H. Stemer; Ralph E. Locher

(57) ABSTRACT

A porous body which has a density of from 40 to 70%, is formed from an Fe-based alloy and contains from 0.01 to 2% by weight of mixed oxide with at least one oxidic compound of one or more metals from the group consisting of Y, Sc, rare earth metals and at least one further oxidic compound of one or more metals from the group consisting of Ti, Al, Cr. The porous body displays no after-shrinkage even at operating temperatures of 900° C., it has very good corrosion resistance and it is particularly suitable as a support substrate for use in high-temperature fuel cells.

18 Claims, 1 Drawing Sheet

POROUS BODY AND PRODUCTION METHOD

CROSS-REFERENCE TO RELATED APPLICATION

This is a continuation, under 35 U.S.C. §120, of copending international application No. PCT/AT2007/000092, filed Feb. 23, 2007, which designated the United States; this application also claims the priority, under 35 U.S.C. §119, of Austrian patent application No. GM 143/2006, filed Feb. 27, 2006; the prior applications are herewith incorporated by reference in their entirety.

BACKGROUND OF THE INVENTION

1. Field of the Invention

The invention relates to a porous body which has a density of from 40 to 70% of the theoretical density and a predominantly open-pored structure and comprises sintered grains of an Fe-based alloy.

Such porous bodies are used as support substrate in high-temperature fuel cells (solid oxide fuel cells; SOFCs). These are operated at temperatures of from about 650 to 900° C., since only at these temperatures do the thermodynamic conditions for efficient energy generation prevail. In the case of planar SOFC systems, individual electrochemical cells made up of a cathode, a solid electrolyte and an anode are stacked to form a stack and connected by means of metallic components, viz. interconnects, bipolar plates or current collectors. These metallic components have to have specific properties. Thus, the thermal expansion has to match that of the cell materials very well. Furthermore, the metallic components must be highly resistant to corrosion by the anode gas and cathode gas. Corrosion products formed have to have a good electron conductivity. Since interconnects contact anode and cathode, they have the additional function of separating the two gas spaces and therefore have to be completely gastight.

The better the contacting on anode and cathode sides by the interconnect components, the lower the ohmic resistances which are made particularly noticeable by the series connection in the case of planar SOFC systems. To cope with the contacting problems associated with interconnect components better, new planar SOFC designs have been developed, in addition to the application of ceramic, usually perovskite contact slips; in the recent past, the MSC (metal supported cell) has also been developed. Here, for example, porous bodies are laid or welded as support substrates into conventional interconnect components comprising compact material, and the cell materials, usually commencing with the anode layer, are applied directly to these porous bodies by means of coating processes, for example high-speed flame spraying, plasma spraying and spraying of a slurry. The direct connection of electrode and interconnect component brought about in this way thus enables very uniform contacting scaled on the micron scale and also a very uniform gas supply to the electrode to be achieved, with the latter function frequently being performed in conventional planar SOFCs by macroscopic gas channels which have been milled in a complicated process into the surface of dense interconnect components. In addition, the cell materials can be made considerably thinner when porous support substrates are used, since the cell materials are not self-supporting components. This not only allows material to be saved but also makes it possible, for thermodynamic reasons, to reduce the operating temperature of SOFC systems.

The latter advantages of good gas supply and contacting are at the direct expense of disadvantages which can likewise be attributed to the high porosity of the support substrate. Due to the high porosity, the surface area of the support substrate which is in contact with the SOFC-specific gases is very large. This can lead to increased corrosion. In addition, a large surface area also represents a large driving force for sintering processes, as a result of which shrinkage of the porous support plate can occur during operation. The surface area increases with decreasing pore diameter at constant density or with increasing porosity.

For use in MSC (metal supported cell) and ASC (anode supported cell) SOFC systems, it is advantageous to use porous metallic support materials together with conventional interconnect components, since these are cheaper and more ductile than ceramic support materials and also have a higher electronic conductivity. Compared to conventional interconnects, the use of such porous bodies has the advantage that the gas can be supplied through the porous body and that the contact to the cell materials is significantly improved, made more uniform and kept at a constant level during the operating time.

Commercial porous products or those specially developed for SOFC applications, e.g. nonwovens and knitteds, as described in European patent publication EP 1 455 404, international PCT publication WO 02/101859 A2, German patent publication DE 101 61 538 and European patent publication EP 1 318 560, have a satisfactory corrosion resistance and a coefficient of thermal expansion matched to the ceramic cell materials under use conditions which are customary for SOFC systems, i.e. at temperatures of about 650-900° C. in corrosive atmospheres. However, it has been found that application of cell materials or of other ceramic protective layers to these porous support substrates cannot be achieved with sufficiently high quality by means of the above-described coating processes since the porous support substrate made up of fine metal wires/fibers does not offer a uniform attack area and at the same time the mechanical stability is not sufficiently high under use conditions.

German published patent application DE 103 25 862 describes a metallic support substrate having a maximum chromium content of 13%. In the pertinent literature (Werner Schatt, "Pulvermetallurgie Sinter- und Verbundwerkstoffe", 3rd ed., 1988; p. 371), sintering temperatures of 1100-1250° C. are reported for the production of porous bodies. Since the temperature of SOFC systems in operation extends up to the usual sintering temperature of Fe—Cr materials, commercial porous support substrates produced from compacted, sintered metallic powders tend to undergo after-sintering, so that it is not possible to obtain a porous material having a density of less than 70% of the theoretical density over the long use times. The undesirable after-sintering leads, in particular as a result of the thermocyclic mode of operation of SOFC systems, to irreversible damage to the deposited cell materials. Even the addition of inorganic or organic substances to form pores, as is described in U.S. patent application publication US 2002/0195188 A1 (cf. international PCT publication WO 01/49440), cannot completely prevent after-sintering of an Fe—Cr alloy under the above-mentioned operating conditions since after-sintering is attributable to both surface and volume sintering mechanisms.

SUMMARY OF THE INVENTION

It is accordingly an object of the invention to provide a porous body, which overcomes the above-mentioned disadvantages of the heretofore-known devices and methods of this general type and which provides for a porous body which comprises an Fe—Cr alloy and does not tend to undergo after-sintering at use temperatures of up to 900° C. and on which ceramic and cermet layers can readily be deposited and which also has a high corrosion resistance and a satisfactory mechanical strength.

With the foregoing and other objects in view there is provided, in accordance with the invention, a porous body, comprising:

a predominantly open-pored structure having a density of from 40 to 70% of a theoretical density and formed of sintered grains of an Fe-based alloy containing >50% by weight of Fe, the alloy including:

15 to 35% by weight of Cr;

to 2% by weight of at least one element selected from the group consisting of Ti, Zr, Hf, Mn, Y, Sc, and rare earth metals;

0 to 10% by weight of at least one element selected from the group consisting of Mo, Al;

1 to 5% by weight of at least one element selected from the group consisting of Ni, W, Nb, Ta;

to 1% by weight of O;

balance Fe and impurities; and wherein at least one metal selected from the group consisting of Y, Sc, rare earth metals, and at least one metal selected from the group consisting of Cr, Ti, Al, Mn form a mixed oxide.

In other words, the porous body has a density of from 40 to 70% of the theoretical density, has a predominantly open-pored structure and is made up of powder grains which are well sintered to one another. For the present purposes, "well sintered" means that sinter necks having a diameter of $>\frac{1}{5}\times$ grain diameter, preferably $>\frac{1}{3}\times$grain diameter, are formed between the individual grains. The alloy consists of 15 to 35% by weight of Cr, from 0.01 to 2% by weight of one or more elements from the group consisting of Ti, Zr, Hf, Mn, Y, Sc, rare earth metals, from 0 to 10% by weight of Mo and/or Al, from 0 to 5% by weight of one or more metals from the group consisting of Ni, W, Nb, Ta, from 0.1 to 1% by weight of O, balance Fe and impurities typical of steel. The reason for the lower and upper limits for the respective alloying elements is given in Table 1 below.

The alloy nominally does not contain any carbon, but carbon contents of from about 50 to 1000 μg/g are obtained as a result of the method of production. Furthermore, at least one metal from the group consisting of Y, Sc, rare earth metals and at least one metal from the group consisting of Cr, Ti, Al, Mn form a mixed oxide. The preferred mixed oxide content is from 0.01 to 2% by weight. The porous body can additionally contain from 0.01 to 1.5% by weight of one or more oxides of metals from the group consisting of Y, Sc, rare earth metals, Ti, Al.

The mixed oxide which is primary important for the invention is preferably formed when using mechanically alloyed powder and sintering temperatures of from 1250° C. to 1470° C. It has now been found that the sinterability is greatly reduced when this mixed oxide is formed. It is therefore possible to produce porous structures at homologous temperatures of up to $0.98\times T_s$ ($T_s$=solidus temperature) using relatively fine powders having a typical average particle size determined by the Fisher method of from 5 to 50 μm. The volume shrinkage on sintering is less than 5%. Such porous structures have virtually no shrinkage at the use temperatures which are substantially lower than the sintering temperature. At 900° C./10 h, the shrinkage is reliably less than 1%.

TABLE 1

| Element | Lower limit [wt. %] | Reason for lower limit | Upper limit [wt. %] | Reason for upper limit |
|---|---|---|---|---|
| Cr | 15 | unsatisfactory corrosion resistance, insufficient effect on mixed oxide formation | 35 | excessively high costs, embrittlement as a result of sigma phase formation |
| Mn | 0.01 | excessive grain boundary growth | 2 | impairment of the corrosion resistance due to very strong affinity |
| Zr, Hf, Ti, Y, Sc, rare earth metals | 0.01 | insufficient corrosion resistance, insufficient effect on mixed oxide formation, insufficient inhibition of sintering | 2 | for oxygen of the oxides forming, in the case of Ti embrittlement as a result of sigma phase formation |
| Mo | 0 | | 10 | high costs, embrittlement as a result of sigma phase formation; poorer processability |
| Al | 0 | | 10 | embrittlement of the matrix, poor processability |
| Ni | 0 | | 5 | impairment of the corrosion resistance, increase in the thermal expansion since phase transformation occurs |
| W | 0 | | 5 | embrittlement, impairment of the corrosion resistance |
| Nb | 0 | | 5 | embrittlement, high costs |
| Ta | 0 | | 5 | embrittlement, high costs |
| O | 0.1 | insufficient formation of mixed oxides | 1 | impairment of the corrosion resistance, internal oxidation |

It has also been found that the effect of the mixed oxide is particularly pronounced when from 1 to 95% of the surface of the sintered grains is covered by the mixed oxide. The mixed oxides can occur as discrete particles or as layers covering the grain surface. The porous body preferably contains from 0.01 to 2% by weight of Y—Ti, Y—Al and/or Y—Al—Ti mixed oxide. It has also been found to be advantageous for the alloy to contain from 0.01 to 1.5% by weight of $Y_2O_3$, from 0.5 to 5% by weight of Mo and from 0.1 to 1% by weight of Ti. In a preferred embodiment, the pore size is from 10 to 30 μm.

In addition, the alloy according to the invention is characterized by an extraordinarily high resistance to corrosion by the cathode and anode gases.

Powder mixtures of elemental or prealloyed powders are used for producing the porous body. The powder mixture is preferably mechanically alloyed. Mechanical alloying is carried out in a high-energy mill, preferably in an attritor. Typical milling times are in the range from 10 to 30 h. The powder mixture is subsequently mixed with an organic binder, with the volume content of binder corresponding approximately to the pore volume of the sintered body. Sintering is carried out at from 1250° C. to 1470° C. under protective gas.

The porous bodies have a thickness of from 200 μm to 20 mm, preferably from 500 to 3000 μm. Geometrically complex structures can also be used.

Protective layers and also active ceramic or cermet-like layers can be deposited very well on the porous body compared to the commercial wire nonwovens and knitteds. The porous bodies are therefore particularly suitable for use as support substrates in SOFC systems.

Other features which are considered as characteristic for the invention are set forth in the appended claims.

Although the invention is described herein as embodied in a porous body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and examples of the invention.

DETAILED DESCRIPTION OF THE INVENTION

EXAMPLE 1

Figure 1:
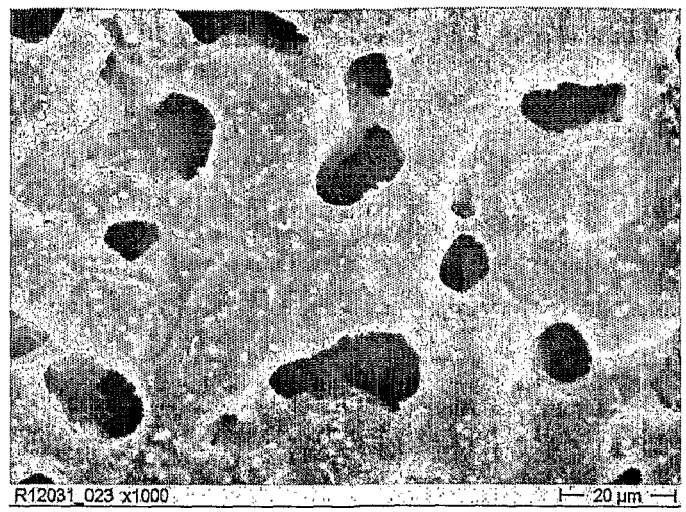
FIG. 1 shows mixed oxide particles on the grain surface of the porous body.
Figure 2:
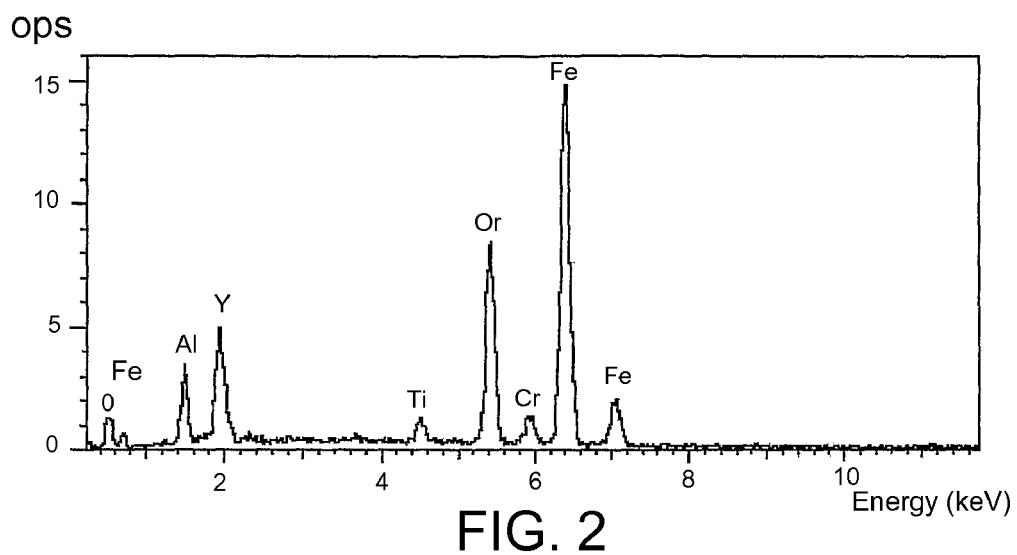
FIG. 2 shows a typical EDX spectrum of a mixed oxide particle.
Figure 3:
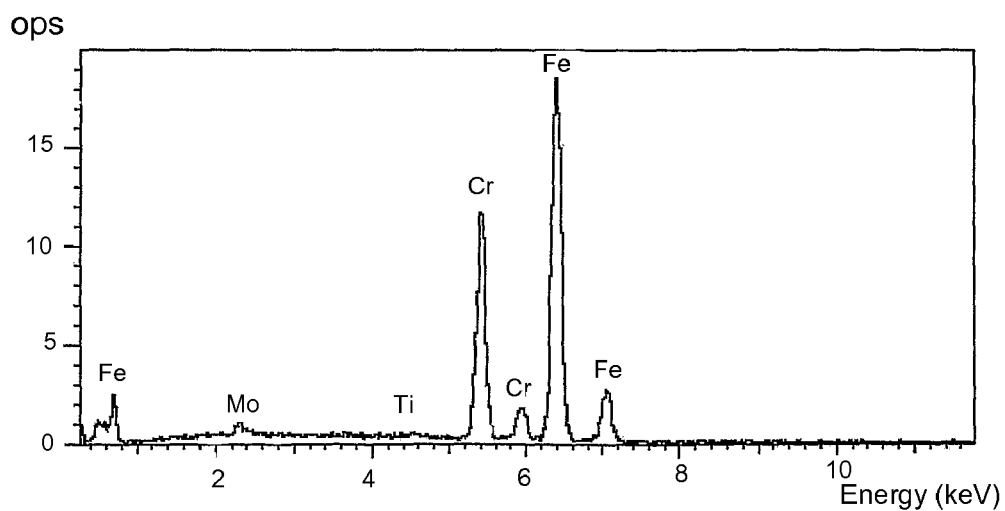
FIG. 3 shows a typical EDX spectrum of the metallic surface of the porous body.

A powder mixture having a composition based on the porous body of 26% by weight of Cr, 0.5% by weight of $Y_2O_3$, 2% by weight of Mo, 0.3% by weight of Mn, 0.3% by weight of Ti and 0.03% by weight of Al was homogenized in a tumbler mixer and subsequently mechanically alloyed under protective gas in an attritor for 12 hours. The powder obtained in this way was sieved to give a particle fraction of <36 μm. After the addition of an organic binder, green bodies having dimensions of 500×300×0.65 mm were produced. The volume content of the binder corresponded approximately to the desired porosity of the porous body. Sintering was carried out at 1450° C. under hydrogen, and the measured lateral shrinkage on sintering was <1%. The sintered body had a density of 4.2 g/cm$^3$ and an average pore size of 10 μm. An Al—Ti—Y-containing mixed oxide was detected at the grain surface, as can be seen from a comparison of the surface and bulk analyses (FIG. 2, FIG. 3). About 5% by area of the surface of the sintered grains was covered by mixed oxide.

EXAMPLE 2

A powder mixture having a composition based on the porous body of 18% by weight of Cr, 0.5% by weight of $La_2O_3$, 3% by weight of Nb, 0.3% by weight of Mn, 0.3% by weight of Zr and 0.03% by weight of Al was homogenized in a tumble mixer and subsequently mechanically alloyed under protective gas in an attritor for 15 hours. Further processing was carried out as described in Example 1, except that a particle fraction of <100 μm was sieved out. The sintered body had a density of 4.4 g/cm$^3$ and an average pore size of 30 μm. An Al—Zr—La-containing mixed oxide was detected on the grain surface. About 7% by area of the surface of the sintered grains was covered by mixed oxide.

The invention claimed is:

1. A porous body, comprising:
    a predominantly open-pored structure having a density of from 40 to 70% of a theoretical density and formed of sintered grains of an Fe-based alloy containing >50% by weight of Fe, the alloy including:
        15 to 35% by weight of Cr;
        0.01 to 2% by weight of at least one element selected from the group consisting of Ti, Zr, Hf, Mn, Y, Sc, and rare earth metals;
        0 to 10% by weight of at least one element selected from the group consisting of Mo and Al;
        0 to 5% by weight of at least one element selected from the group consisting of Ni, W, Nb, and Ta;
        0.1 to 1% by weight of O;
        balance Fe and impurities; and
    wherein at least one metal selected from the group consisting of Y, Sc, and rare earth metals, and at least one metal selected from the group consisting of Cr, Ti, Al, and Mn form a mixed oxide; and
    wherein a proportion of from 1 to 95% of a surface of the sintered grains is covered by the mixed oxide.

2. The porous body according to claim 1, wherein the mixed oxide content is from 0.01 to 2% by weight.

3. The porous body according to claim 1, which contains from 0.01 to 1.5% by weight of one or more oxides of metals selected from the group consisting of Y, Sc, rare earth metals, Ti, and Al.

4. The porous body according to claim 1, having a volume shrinkage of <1% at 900° C./10 h.

5. The porous body according to claim 1, wherein said alloy contains from 0.01 to 2% by weight of at least one of Y—Ti, Y—Al and Y—Al—Ti mixed oxide.

6. The porous body according to claim 1, wherein said alloy contains from 18 to 28% by weight of Cr.

7. The porous body according to claim 1, wherein said alloy contains from 0.5 to 5% by weight of Mo.

8. The porous body according to claim 1, wherein said alloy contains from 0.1 to 1% by weight of Ti.

9. The porous body according to claim 1, wherein said alloy contains from 0.01 to 1.5% by weight of $Y_2O_3$.

10. The porous body according to claim 1, wherein an average pore size of pores in the porous body is from 5 to 100 μm.

11. The porous body according to claim 10, wherein the average pore size is from 10 to 30 μm.

12. The porous body according to claim 1, wherein an average grain size is from 20 to 70 μm.

13. The porous body according to claim 1, wherein a sinter neck diameter is $>\frac{1}{5} \times$ grain size.

14. The porous body according to claim 1, wherein a sinter neck diameter is $>\frac{1}{3} \times$ grain size.

15. The porous body according to claim 1 configured as a support substrate.

16. The porous body according to claim 1, wherein said alloy consists of:
   15 to 35% by weight of Cr;
   0.01 to 2% by weight of at least one element selected from the group consisting of Ti, Zr, Hf, Mn, Y, Sc, and rare earth metals;
   an amount of 0 to 10% by weight of at least one element selected from the group consisting of Mo and Al;
   an amount of 0 to 5% by weight of at least one element selected from the group consisting of Ni, W, Nb, and Ta;
   0.1 to 1% by weight of O; and
   balance Fe and impurities.

17. A process for producing a porous body according to claim 1, which comprises the following steps:
   producing a powder mixture using elemental or prealloyed powders;
   mechanically alloying the powder mixture;
   mixing the powder mixture with binder, with a volume content of the binder substantially corresponding to a pore volume of the sintered, porous body;
   sintering at $1250°$ C.$\leq$T$\leq$$1470°$ C. in a protective gas atmosphere; and
   thereby producing the porous body according to claim 1.

18. An SOFC system, comprising the porous body according to claim 1.

* * * * *